US009216856B2

(12) United States Patent
Howell et al.

(10) Patent No.: US 9,216,856 B2
(45) Date of Patent: Dec. 22, 2015

(54) SELF-CONTAINED AUXILIARY COLLECTION SYSTEM FOR A REFUSE TRUCK

(75) Inventors: Troy D. Howell, Mantorville, MN (US); Daniel F. Kubista, Pine Island, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 863 days.

(21) Appl. No.: 13/428,349

(22) Filed: Mar. 23, 2012

(65) Prior Publication Data
US 2013/0251485 A1    Sep. 26, 2013

(51) Int. Cl.
*B65F 3/02* (2006.01)
*B65F 3/04* (2006.01)
*B65F 3/14* (2006.01)
*G01G 19/08* (2006.01)

(52) U.S. Cl.
CPC .............. *B65F 3/041* (2013.01); *B65F 3/143* (2013.01); *B65F 2003/022* (2013.01); *B65F 2003/0246* (2013.01); *B65F 2003/0279* (2013.01); *G01G 19/08* (2013.01)

(58) Field of Classification Search
CPC .. B65F 3/041; B65F 3/143; B65F 2003/0279; B65F 2003/023; B65F 2003/0246; B65F 2003/022; B65F 2003/041; B65F 2003/048; B65F 2210/184; G01G 19/14; G01G 23/18; G01G 19/08

USPC .............. 91/405, 42, 275; 414/408, 419, 421, 414/699, 406, 551, 553, 552, 554, 555
See application file for complete search history.

(56) References Cited

U.S. PATENT DOCUMENTS

| 3,572,529 | A | * | 3/1971 | Anderson | 414/408 |
|---|---|---|---|---|---|
| 4,771,837 | A | * | 9/1988 | Appleton et al. | 177/139 |
| 4,773,812 | A | * | 9/1988 | Bayne et al. | 414/408 |
| 5,004,392 | A | * | 4/1991 | Naab | 414/21 |
| 5,038,876 | A | * | 8/1991 | Smith | 177/139 |
| 5,049,026 | A | * | 9/1991 | Bingman et al. | 414/408 |
| 5,071,303 | A | * | 12/1991 | Carson | 414/21 |
| 5,071,307 | A | * | 12/1991 | Carson | 414/408 |
| 5,209,312 | A | * | 5/1993 | Jensen | 177/136 |
| 5,484,245 | A | | 1/1996 | Zopf | |
| 5,826,485 | A | | 10/1998 | Bayne et al. | |
| 5,833,428 | A | * | 11/1998 | Szinte | 414/408 |
| 5,931,628 | A | | 8/1999 | Christenson | |
| 6,059,511 | A | | 5/2000 | Anderson et al. | |
| 6,158,945 | A | | 12/2000 | Anderson et al. | |
| 6,167,795 | B1 | | 1/2001 | Bayne et al. | |
| 6,448,898 | B1 | * | 9/2002 | Kasik | 340/686.1 |
| 6,565,305 | B2 | | 5/2003 | Schrafel | |
| 7,070,381 | B2 | * | 7/2006 | Khan et al. | 414/408 |
| 2009/0261761 | A1 | * | 10/2009 | Yoshioka | 318/139 |
| 2011/0116899 | A1 | * | 5/2011 | Dickens | 414/21 |
| 2012/0027548 | A1 | * | 2/2012 | Whitfield et al. | 414/408 |

\* cited by examiner

*Primary Examiner* — Glenn Myers
(74) *Attorney, Agent, or Firm* — Foley & Lardner LLP

(57) ABSTRACT

There is disclosed a self-contained cart-tipping system for residential applications that can be installed on a variety of refuse collection truck types, including front loading, side loading and rear loading models. The cart tipper system of the invention includes independent hydraulic and electrical systems and needs only to be served by a source of electric power.

10 Claims, 6 Drawing Sheets

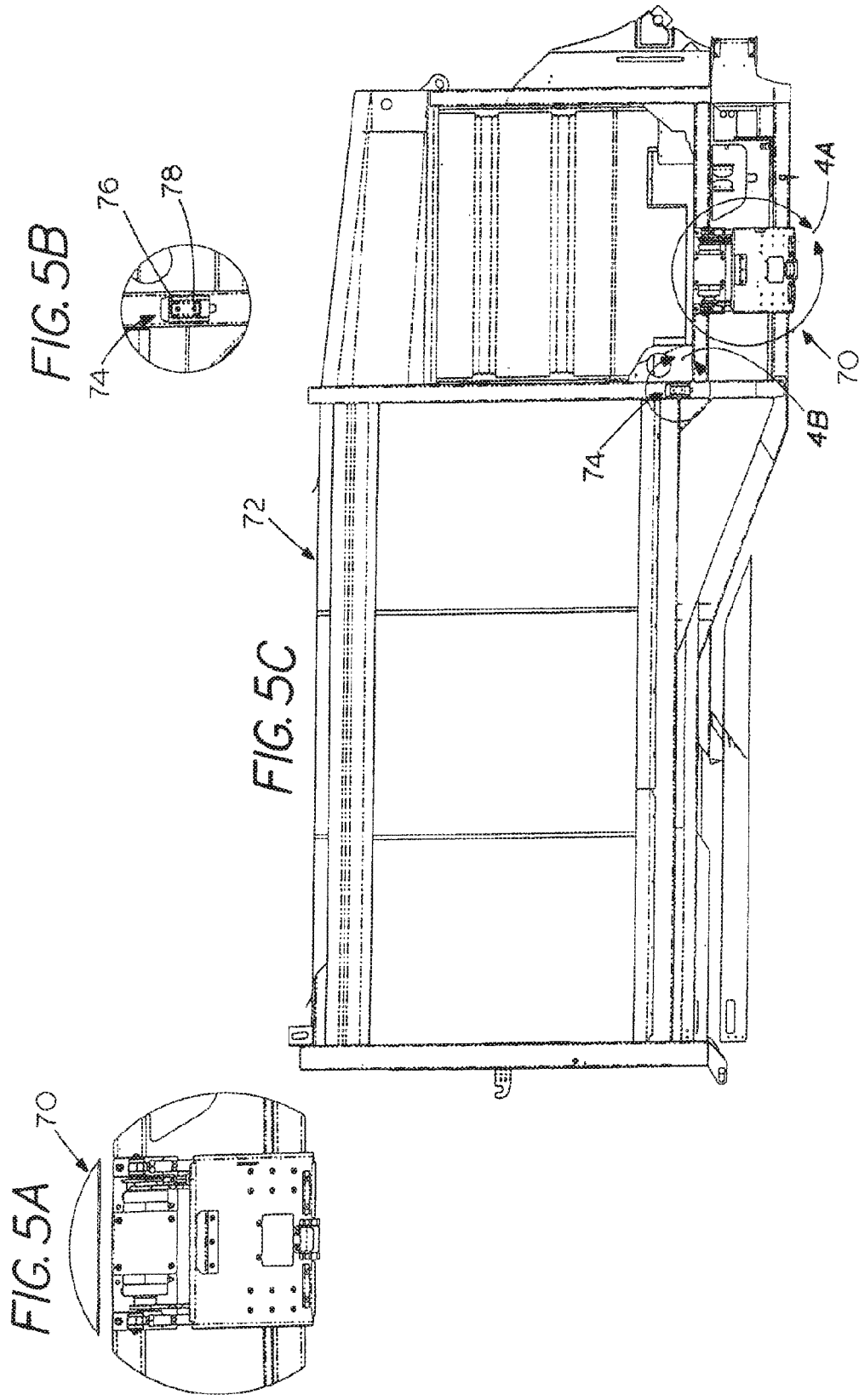

SELF-CONTAINED AUXILIARY COLLECTION SYSTEM FOR A REFUSE TRUCK

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention concerns refuse collection vehicles, generally, and, more particularly, refuse collection vehicle auxiliary mechanisms in the form of container handling devices, specifically cart tipping or lift and dump mechanisms which may be associated with front, side or rear-loading vehicles used for residential collection. The container handling device of the invention is a self-contained system that requires only an electrical connection to a source of power on the vehicle.

II. Related Art

Technology related to refuse collection, particularly related to residential refuse collection, has advanced rapidly and significantly in the last several decades, owing to changes both in the carts or containers themselves and the cart tippers or handling devices. Thus, in residential rubbish collection, for example, traditional galvanized metal trash containers formerly emptied by hand into rear-loading refuse packing vehicles have been replaced by locally standardized wheeled cart-type containers made from synthetic materials which have a hinged lid and integral tipping bar that permits mechanical manipulation for lifting and dumping. These carts typically are larger and heavier than those formerly emptied by hand (up to 500 pounds) and are designed to be wheeled on two wheels up to and addressed by compatible cart-tipping mechanisms mounting on refuse vehicles which grab the tipping box, lift and invert or tip the carts to empty them. The tipping bar of the cart is typically positioned so as to be hooked by a fixed element of the container tipping mechanism which is thereafter operated by a driver or other member of the collection crew to lift, dump and return the container to an upright position at the end of a receptacle emptying cycle. The cart may then be wheeled back to its former position.

Such cart-tipping mechanisms have been commonly associated with residential refuse collection, rear-loading refuse vehicles in which they are mounted on the rear of the vehicle and connected to both the vehicle electrical and hydraulic systems. Such devices are shown, for example, in U.S. Pat. No. 6,565,305 to Schrafel. More recently, front-loading and side-loading refuse vehicles have also been used for residential refuse collection. Front-loading vehicles include a pair of lifting arms which have a pair of corresponding lifting forks attached to the free ends of the arms and which engage channels in the sides or bottoms of box-type trash containers to facilitate lifting the containers over the cab of the vehicle and dumping the contents into the vehicle body. The lifting arms and forks are typically operated by separate sets of hydraulic cylinders which are manually controlled by the vehicle operator.

It is known to mount a box-type refuse collection container or "carry-can" on the front of a front-loading refuse collection vehicle which itself carries a cart-tipping mechanism which empties residential cart-type refuse containers into the refuse collection container mounted on the front of the front-loading vehicle. The carry-can is then periodically itself emptied into the body of the vehicle in the manner of emptying commercial-type refuse boxes. An example of this is shown, for example, in U.S. Pat. No. 6,167,795 to Bayne et al. That discloses the mounting of a lifting device 20 on different types of collection vehicles including front-loading vehicle where it is attached for emptying carts into relatively larger collection box 46. A further side-loading mechanism is shown in U.S. Pat. No. 5,931,628 to Christenson. These devices must also be hooked up to the truck's electrical and hydraulic systems for operation.

While prior cart-handling and tipping devices successfully collect refuse, they have several drawbacks. Such devices which make use of the refuse vehicle's main hydraulic system require the vehicle to maintain an elevated idle speed to maintain the required hydraulic parameters. The addition of one or more such devices may even require a larger hydraulic system to be installed. Accordingly, there remains a need for a cart-tipping mechanism that is self-contained and includes its own hydraulic system needing only an electrical hookup and that can be used with any type refuse collection including front, side and rear-loading types and, thus, is easily added to a refuse vehicle.

SUMMARY OF THE INVENTION

By means of the present invention, there is provided a self-contained cart-tipping system for residential applications that can be installed on a variety of refuse collection truck types, including front loading, side loading and rear loading models. The cart tipper system of the invention includes independent hydraulic and electrical systems and needs only to be served by a source of electric power. Thus, the only required interface with the refuse vehicle is a battery connection.

The cart-tipping hydraulic system includes a hydraulic fluid reservoir, hydraulic pumps and motor assembly, a control manifold block and a rotary hydraulic tipper device. The electrical system includes positive and negative battery connectors with suitable disconnect switches, a control box for operating the tipping device by controlling hydraulic valves in the manifold block, an emergency stop switch near the positive battery connector and at the operating panel near the hydraulic pump, and a pump motor control solenoid.

BRIEF DESCRIPTION OF THE DRAWINGS

In the drawings wherein like reference characters designate like parts:

FIGS. 5A-5C are detail views and a fragmentary side view of a side-loading refuse body for a vehicle showing a self-contained cart tipping system in accordance with the invention, mounted on the side-loading refuse body;

DETAILED DESCRIPTION

The following description details one or more exemplary embodiments illustrating the present invention. It will be appreciated that the detailed descriptions are intended by way of example only and are not intended to limit the scope of the invention in any respect. It will be further understood that the embodiments of the invention can be modified by those skilled in the art while remaining in keeping with the inventive concepts.

Figure 1:
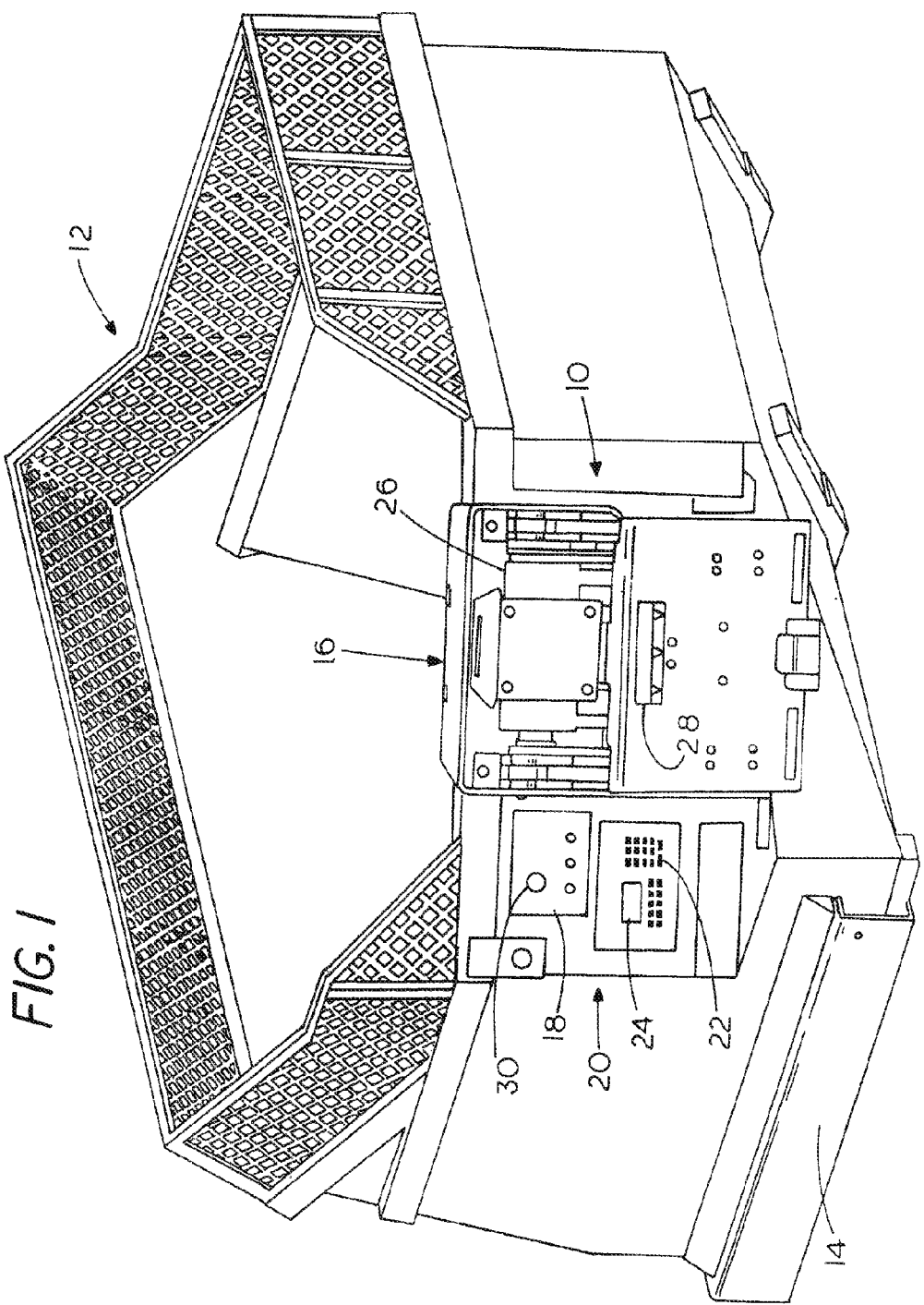
FIG. 1 is a perspective view which depicts a cart tipper system in accordance with the invention mounted on a box-type air carry-can container designed to be carried by a front-loading refuse collection vehicle.
Figure 2:
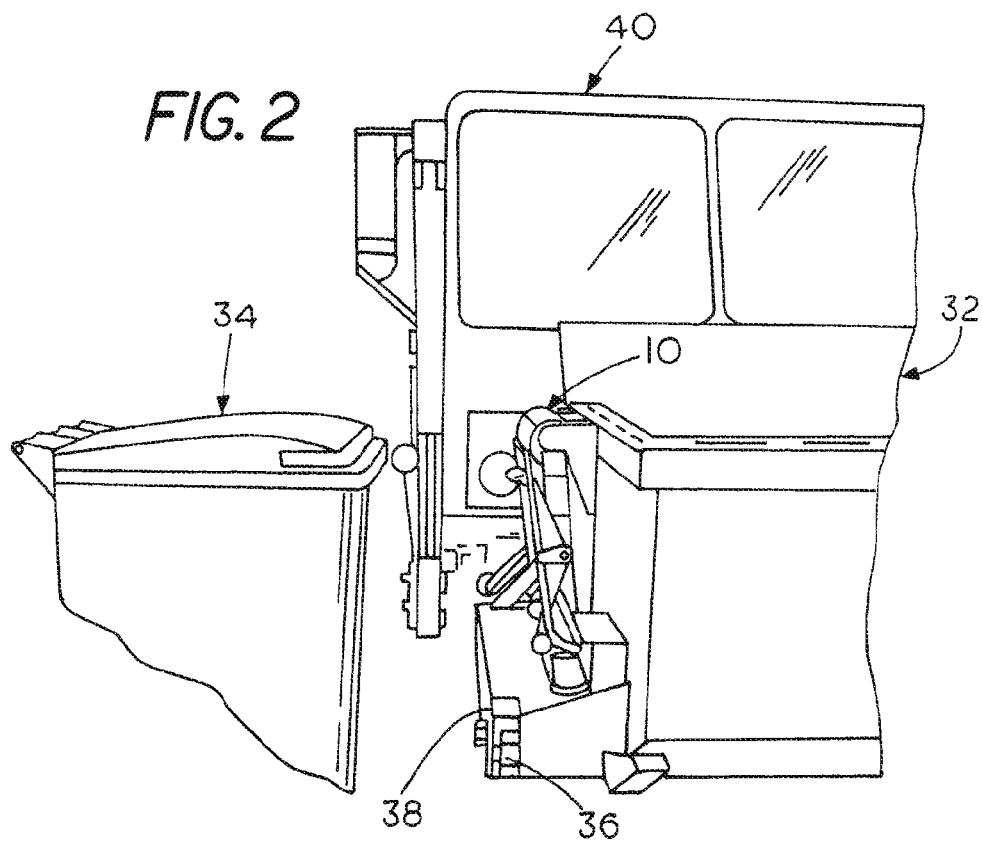
FIG. 2 is a front perspective view which depicts a cart tipper system in accordance with the invention attached to the side of another box-type container carried by a front-loading refuse vehicle.
Figure 3:
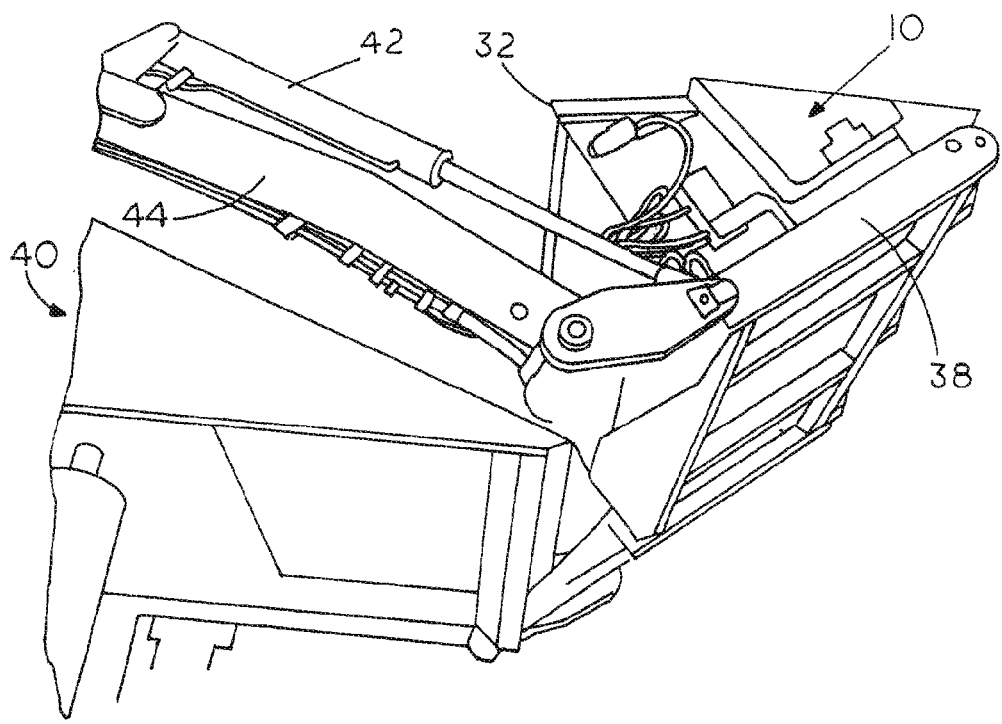
FIG. 3 is a fragmentary side view of the container of FIG. 2 in a raised position for emptying or returning to a lowered position.

FIG. 1 depicts a cart-tipping assembly, generally at 10, mounted on a larger box-type refuse collection container or 12 which is designed to hold about 3 cubic yards of refuse to be carried by a front loading refuse vehicle of the type shown in FIGS. 2 and 3. The container includes a pair of side channels for receiving the forks of a front loading refuse collection vehicle, one of which is shown at 14. The cart-tipping assembly includes a rotary tipping mechanism 16 with a control panel 18 for operating the system, a data input/output terminal 20 which can be used to enter weight, address and other permanent data pertaining to individual carts, if desired, with keypad 22 and LED screen 24. The cart-tipping system may include a built-in scale (not shown) that enables such individual containers to be weighed before and after being emptied. The rotary tipper is shown at 26 and a grabbing bar for engaging a cart-tipping bar is shown at 28. An emergency stop button is shown at 30.

FIG. 2 depicts a similar cart-tipping system attached to a container 32 and a typical cart to be tipped is shown at 34. The container 32 is carried by a pair of lifting forks, one of which is shown at 36 in container channel 38. A front-loading refuse vehicle is shown at 40.

In FIG. 3, the container 32 of FIG. 2 is shown in a raised position. The truck forks are pivoted by a pair of hydraulic cylinders, one of which is shown at 42 connected to main pivoting arms as at 44.

Figure 4A:
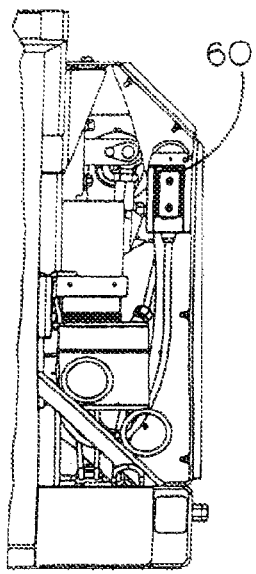
FIGS. 4A, 4B and 4C depict fragmentary rear elevational, fragmentary front perspective and side perspective views of a cart tipper system as in FIGS. 1-3 mounted on a box-type container.
Figure 4B:
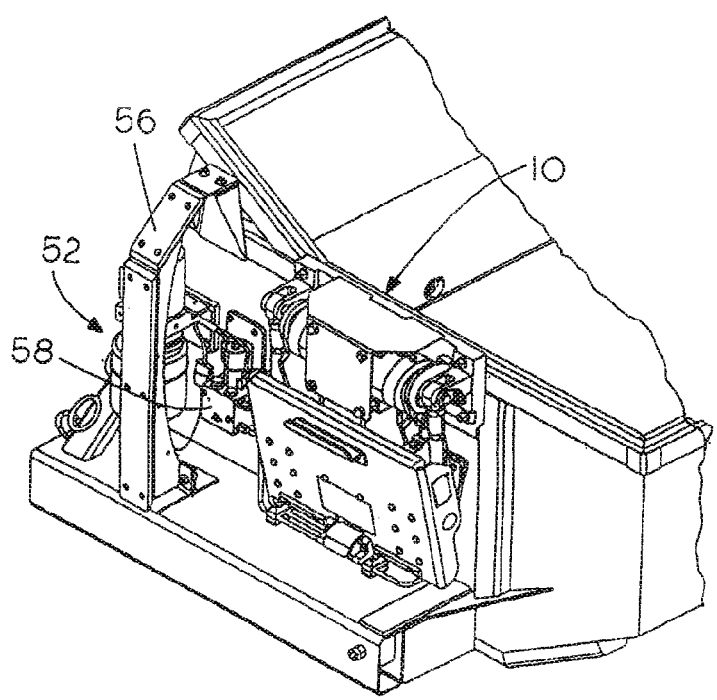
Figure 4C:
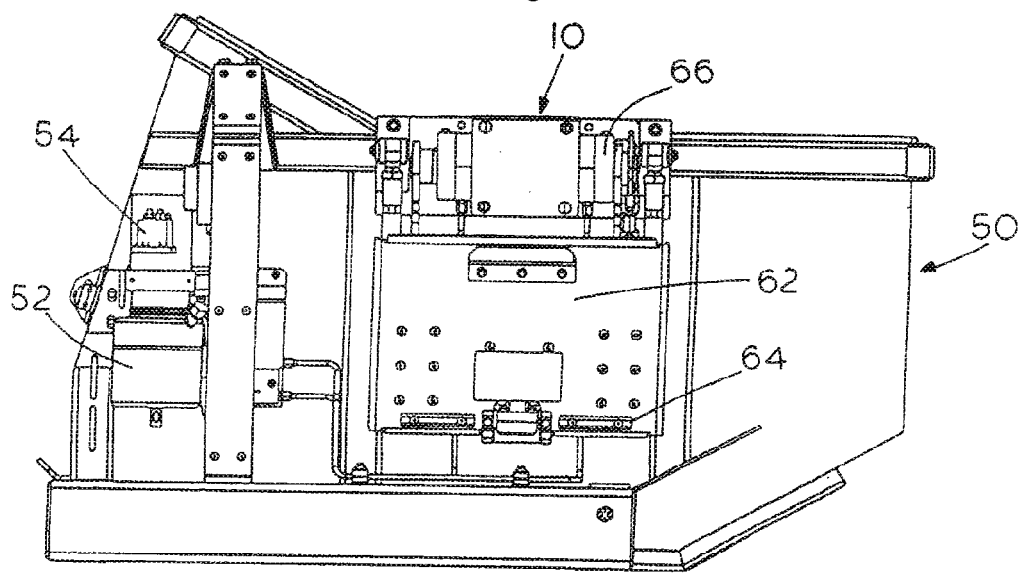
Figure 6A:
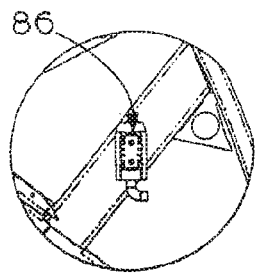
FIGS. 6A-6D depict views including fragmentary detail views of a tailgate of a rear-loading refuse collection vehicle showing a self-contained, cart tipping system in accordance with the invention mounted on the tailgate.
Figure 6B:
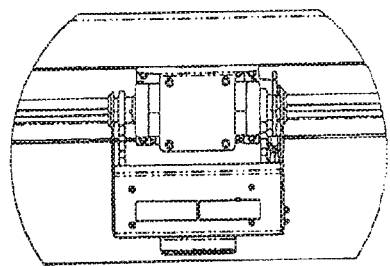
Figure 6C:
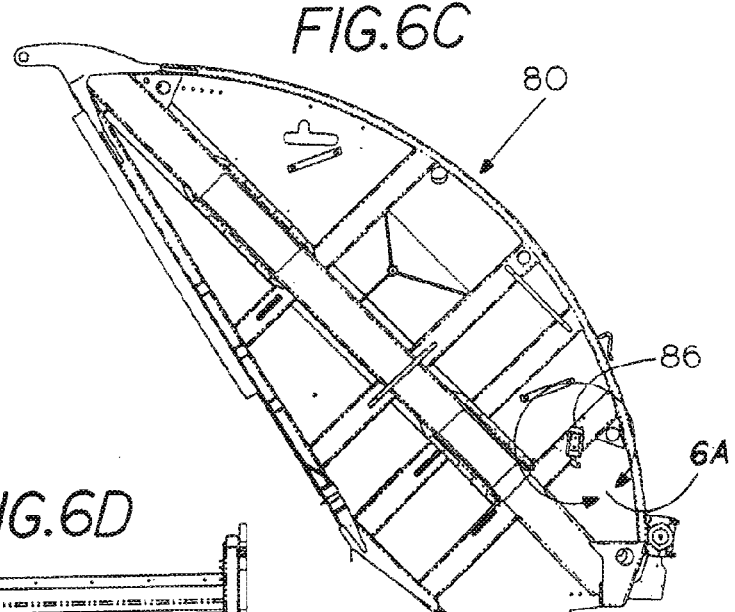
Figure 6D:
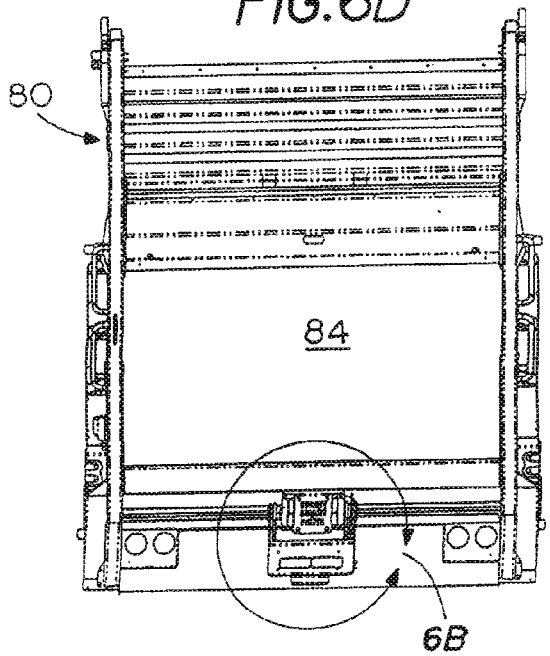

FIGS. 4A, 4B and 4C depict the cart tipper system 10 mounted on a larger box-type container 50. Main components of the cart tipper system include a hydraulic pump and reservoir system with electric pump motor shown generally at 52. A pump motor solenoid is shown at 54 and a protective frame at 56. The hydraulic control manifold block is shown at 58 and a control box is shown at 60. A grabbing bar 62 and lower engaging assembly 64 are designed to engage a compatible cart. The tipper is actuated by a rotary hydraulic drive 66.

FIGS. 5A-5C depict a cart tipper system in accordance with the invention 70 (enlarged in FIG. 5A) mounted on a manual side-loading refuse body 72 (shown with tailgate removed) designed to be mounted, in turn, on a refuse vehicle chassis (not shown) in a well-known manner. The cart tipper system 70, as described above, is self-contained and needs only an electrical connection to the vehicle. A control panel for operating the tipper is shown at 74 (enlarged in FIG. 5B) with control buttons 76 and 78.

FIGS. 6A-6D show a rear-loading, rear discharging tailgate 80 with a cart tipper system in accordance with the invention 82 (enlarged in FIG. 6B) shown attached to the tailgate for tipping carts into the loading/discharge hopper 84. A manual pushbutton control panel for operating the tipper is shown at 86 (enlarged in FIG. 6A). As with the other examples, the cart tipper system 82 is entirely self-contained and uses only a source, of electric power.

Figure 7:
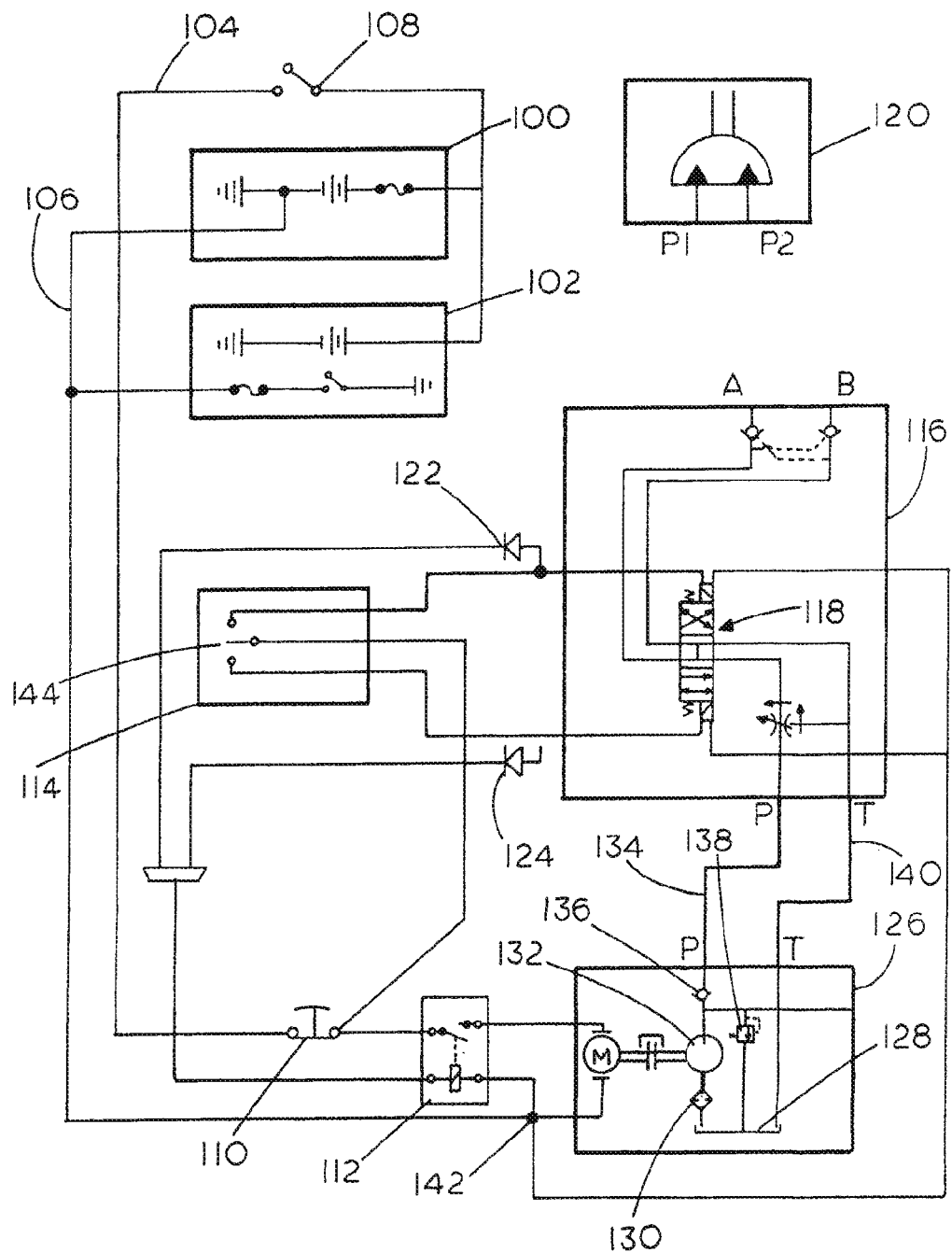
FIG. 7 is a combined electrical and hydraulic schematic diagram for a cart tipper system in accordance with the invention.

FIG. 7 depicts a combined electrical and hydraulic schematic diagram. Positive and negative electrical fused connections are shown at 100 and 102 with corresponding conductors 104 and 106, respectively. Emergency shutoff or E-stop devices are provided in positive conductor 104 near the battery connection at 108 and near the hydraulic pump controls at 110. A pump motor control solenoid device is depicted at 112 and a main control box appears at 114. The hydraulic manifold block 116 includes a dual or three-position hydraulic spool valve 118 that includes UP and DOWN-operating switch positions at 51 and 52 which direct the rotation of the rotary actuator of the tipper shown schematically at 120. Of course, other embodiments of the tipper could also be equipped with a cylinder or another type of actuator. Control diodes for the valve 118 are shown at 122 and 124.

The hydraulic reservoir, hydraulic pump and motor assembly are shown generally at 126 and include reservoir 128 and a filter 130 at the intake of pump 132. The high pressure line 134 includes a check valve 136 and return drain or dump valve 138, the main or operating return line is shown at 140.

The negative or ground cable is routed from the chassis battery box directly to the ground stud 142 on the hydraulic pump motor. The grounds for the pump motor solenoid and manifold block coils are also connected to the ground stud on the hydraulic pump motor.

In operation, the emergency stop switches are normally closed so that power is provided to the control box and the pump motor solenoid. When the pump motor solenoid is energized, power is passed to the hydraulic pump motor to activate the pump.

The pump provides high pressure hydraulic fluid flow to the manifold block. The manifold block controls the flow to the cart tipper. The manifold block contains the hydraulic spool with two (2) electrical coils to shift the spool. When the spool is actuated from the control box, hydraulic flow is selectively directed to control the UP and DOWN cycle function for the cart tipper. A cycle typically takes about 5-8 seconds.

The coils on the manifold block are energized by a two-position switch 144 located in the control box. The control box switch is selected to control the UP and DOWN functions for the cart tipper. Simultaneously, when the switch is actuated, a signal is also sent to the pump motor solenoid to run the hydraulic pump to cycle the cart tipper mechanism.

Importantly, the fact that the self-contained cart tipper of the present invention has its own hydraulic and control systems gives it a distinct advantage. Most refuse trucks, including front-loading, side-loading and rear-loading systems for residential use, require extra hydraulic and electrical systems to accommodate the addition of a hydraulic operated tipper system in addition to the tipper itself to be installed on the truck and require the vehicle engine idle to be advanced in order to run the hydraulics. The cart tipper of the present invention, on the other hand, requires only a connection to the existing electrical source and enables the vehicle engine to run at normal idle during operation of the cart tipper which provides significant fuel savings and reduced noise during collection efforts.

The system can also be provided with a curb weigh system so that each refuse collection cart can be weighed individually during collection and the weight recorded and associated with a particular address using the data input/output terminal 20. Such a system may be a computer-based tool for receiving and managing transaction data at the cart unloading point. A wireless Ethernet interface may be used to communicate with weight terminals on a refuse vehicle to upload and store weight transactions from each individual pick-up point. Such a system, which may have a cycle time of 8-10 seconds, is available, for example, from Weigh-Tronix, Inc. of Fairmont, Minn.

This invention has been described, herein in considerable detail in order to comply with the patent statutes and to provide those skilled in the art with the information needed, to apply the novel principles and to construct and use embodiments of the example as required. However, it is to be understood that the invention can be carried out by specifically different devices and that various modifications can be accomplished without departing from the scope of the invention itself.

What is claimed is:

1. A self-contained auxiliary cart-tipping system for use with a refuse collection vehicle, the system comprising:
   (a) an electrical system comprising electrical connection devices to connect to a vehicle power source, and a control box for controlling the operation of the tipping system;
   (b) a self-contained hydraulic system comprising a hydraulic fluid reservoir and a hydraulic pump with an electric motor drive and a control manifold;
   (c) a cart tipper comprising an actuator and a cart grabbing device for addressing a cart of interest, wherein said actuator is connected to said hydraulic manifold;
   (d) means for weighing said cart as it is processed and means for recording data regarding cart weight and location; and
   (e) wherein said electrical system controls the operation of said hydraulic system using said manifold.

2. A self-contained auxiliary cart-tipping system as in claim 1 mounted on a collection container designed to be carried by said refuse collection vehicle selected from the group consisting of front-loading, side-loading and rear-loading vehicles.

3. A self-contained auxiliary cart-tipping system as in claim 2 wherein said vehicle is a front-loading vehicle and said cart-tipping system is mounted on said container carried by said vehicle.

4. A self-contained auxiliary cart-tipping system as in claim 2 wherein said vehicle is a side-loading vehicle.

5. A self-contained auxiliary cart-tipping system as in claim 3 wherein said actuator is a rotary actuator.

6. A self-contained auxiliary cart-tipping system as in claim 2 wherein said vehicle is a rear-loading vehicle.

7. A self-contained auxiliary cart-tipping system as in claim 1 wherein said vehicle is a front-loading vehicle and said cart-tipping system is mounted on a container carried by said vehicle.

8. A self-contained auxiliary cart-tipping system as in claim 7 wherein said actuator is a rotary actuator.

9. A self-contained auxiliary cart-tipping system as in claim 1 wherein said actuator is a rotary actuator.

10. A self-contained auxiliary cart-tipping system as in claim 1 wherein said control manifold further comprises a multi-position spool valve.

\* \* \* \* \*